(12) United States Patent
O'Leary et al.

(10) Patent No.: US 9,057,484 B2
(45) Date of Patent: Jun. 16, 2015

(54) BYPASS FEEDER DEVICE

(75) Inventors: Michael John O'Leary, Port Jervis, NY (US); Tim James O'Leary, Port Jervis, NY (US)

(73) Assignee: Huguenot Laboratories, Port Jervis, NY (US)

( * ) Notice: Subject to any disclaimer, the term of this patent is extended or adjusted under 35 U.S.C. 154(b) by 171 days.

(21) Appl. No.: 13/814,279

(22) PCT Filed: Aug. 5, 2011

(86) PCT No.: PCT/US2011/046735
§ 371 (c)(1),
(2), (4) Date: Feb. 5, 2013

(87) PCT Pub. No.: WO2012/021398
PCT Pub. Date: Feb. 16, 2012

(65) Prior Publication Data
US 2013/0133749 A1      May 30, 2013

Related U.S. Application Data

(60) Provisional application No. 61/372,704, filed on Aug. 11, 2010.

(51) Int. Cl.
*G05D 11/00* (2006.01)
*F17D 1/08* (2006.01)
(Continued)

(52) U.S. Cl.
CPC . *F17D 1/08* (2013.01); *A62C 5/002* (2013.01); *A62C 35/60* (2013.01); *A62C 35/68* (2013.01); *B01F 5/0495* (2013.01); *B01F 15/0416* (2013.01); *C02F 1/686* (2013.01)

(58) Field of Classification Search
USPC .............. 137/186, 101.11, 205.5, 240, 564.5, 137/565.3, 565.22, 565.32, 565.33, 888, 137/889, 890, 99; 239/310; 417/170
See application file for complete search history.

(56) References Cited

U.S. PATENT DOCUMENTS 607,562 A  *  7/1898  Almstead ........................... 137/7
1,736,803 A  *  11/1929  Shields et al. ............. 137/564.5

(Continued)

FOREIGN PATENT DOCUMENTS

EP        1147788 A2    10/2001

OTHER PUBLICATIONS

International Search Report for PCT/US2011/046735.

*Primary Examiner* — Kevin Murphy
*Assistant Examiner* — R. K. Arundale
(74) *Attorney, Agent, or Firm* — Caesar Rivise, PC

(57) ABSTRACT

A device and method for chemicals to be fed into a water system, treating the water system as it enters, for example, a fire protection mains and/or fire protection systems (FPS) to protect and maintain the longevity of the water system preventing damages to the water system or enhancing the operation characteristics of the system. This device is a treatment system that may be installed as a portable or permanent device with chemicals such as, corrosion inhibitors, wetting agents, polymeric dispersants, biocides, biostats or other water chemical enhancing effects with means for injecting the chemicals into the fire protection system or a bypass feed system (20) utilizing the fluid means without the need for any electricity. Activation of the pump(1) occurs when water enters the FPS mains and FPS sprinkler system from an outside source. Valving (22, 24) is included to isolate the pump and drums, storage tank to prevent backflow from the FPS.

11 Claims, 9 Drawing Sheets

(51) Int. Cl.
  *A62C 35/60* (2006.01)
  *A62C 35/68* (2006.01)
  *B01F 5/04* (2006.01)
  *B01F 15/04* (2006.01)
  *C02F 1/68* (2006.01)
  *A62C 5/00* (2006.01)

(56) References Cited

U.S. PATENT DOCUMENTS

| | | |
|---|---|---|
| 2,238,747 A | 4/1941 | Ornstein |
| 2,594,519 A * | 4/1952 | Thurber et al. .......... 137/101.11 |
| 3,903,968 A | 9/1975 | Livingston |
| 3,963,038 A * | 6/1976 | Jensen ............................ 137/99 |
| 4,460,008 A | 7/1984 | O'Leary |
| 4,464,315 A | 8/1984 | O'Leary |
| 4,648,043 A | 3/1987 | O'Leary |
| 4,659,459 A | 4/1987 | O'Leary |
| 4,722,363 A * | 2/1988 | Allyn ....................... 137/601.18 |
| 5,390,665 A * | 2/1995 | Leach ...................... 128/203.25 |
| 5,447,641 A * | 9/1995 | Wittig ........................... 210/756 |
| 5,696,696 A | 12/1997 | Gunther |
| 5,803,180 A | 9/1998 | Talley |
| 6,221,263 B1 | 4/2001 | Pope |
| 6,406,618 B1 | 6/2002 | O'Leary |
| 6,523,991 B1 * | 2/2003 | Maklad ....................... 366/163.2 |
| 2008/0217260 A1 * | 9/2008 | Papageorge .................. 210/753 |

\* cited by examiner

Jockey Pump Bypass Feeder Device

BYPASS FEEDER DEVICE

CROSS-REFERENCE TO RELATED APPLICATIONS

This U.S. national phase application claims the benefit under 35 U.S.C. §371 of PCT application no. PCT/US2011/046735 filed on Aug. 5, 2011 which claims the benefit under 35 U.S.C. §119(e) of Provisional Application Ser. No. 61/372,704 filed on Aug. 11, 2010 and both of which are entitled BYPASS FEEDER DEVICE and both of whose entire disclosures are incorporated by reference herein.

BACKGROUND OF THE INVENTION

1. Field of Invention

The present invention generally relates to the field of fluid treatment devices and, more particularly, to water treatment devices for fire protection mains or fire protection systems.

2. Description of Related Art

The treatment of water systems is known in the art, such as those disclosed in U.S. Pat. No. 4,460,008 (O'Leary et al.); U.S. Pat. No. 4,464,315 (O'Leary); U.S. Pat. No. 4,648,043 (O'Leary); U.S. Pat. No. 4,659,459 (O'Leary et al.); U.S. Pat. No. 5,696,696 (Gunther, et al.); and U.S. Pat. No. 5,923,571 (Gunther, et al.). This includes the treatment of water within fire sprinkler systems, such as those shown in U.S. Pat. No. 5,803,180 (Talley); U.S. Pat. No. 6,221,263 U.S. Pat. No. (Pope, et al.); and U.S. Pat. No. 6,406,618 (O'Leary).

However, despite the presence of such systems, there still remains a need for treating fluid (e.g., water) systems, especially fire sprinkler or protection systems, using low cost, affordable chemical treatment devices and which are also highly accurate and repeatable. Furthermore, it is desirable for such a device to reduce its carbon footprint by not requiring any electricity to operate.

All references cited herein are incorporated by reference herein in their entireties.

BRIEF SUMMARY OF THE INVENTION

An apparatus is disclosed for automatically feeding a precise amount of at least one chemical (e.g., corrosion inhibitors, wetting agents, polymeric dispersants, biocides, biostats or other water chemical enhancing effects, etc.) to a flow of a fluid system (e.g., municipal or building fire sprinkler systems, cooling tower systems, boiler systems, waste water systems, metal-finishing systems, potable water systems, vehicle washing systems, agricultural applications, etc.). The apparatus comprises: at least one pump (e.g., a non-electrically activated pump), coupled to at least one chemical container (e.g., pails, drums, tanks, totes and trucks, etc.), wherein the at least one pump draws an amount of the at least one chemical from the container that is directly proportional to a volume of fluid entering the pump only when the pump is exposed to the flow of the fluid system; an inlet valve for coupling an upstream side of the pump to the fluid system and an outlet valve for coupling a downstream side of the pump to the fluid system to form a bypass for diverting a portion of the fluid flow therethrough.

A method is disclosed for automatically feeding a precise amount of at least one chemical (e.g., corrosion inhibitors, wetting agents, polymeric dispersants, biocides, biostats or other water chemical enhancing effects, etc.) to a flow of a fluid system (e.g., municipal or building fire sprinkler systems, cooling tower systems, boiler systems, waste water systems, metal-finishing systems, potable water systems, vehicle washing systems, agricultural applications, etc.). The method comprises: forming a bypass fluid path around a control valve or a pump of a fluid system wherein the bypass fluid path includes at least one non-electrically activated pump; coupling the at least one non-electrically activated pump to at least one chemical container (e.g., pails, drums, tanks, totes and trucks, etc.); diverting a portion of a fluid from a main flow in the fluid system to flow through the at least one non-electrically activated pump; drawing an amount of the at least one chemical, through the at least one non-electrically activated pump, from the at least one chemical container that is directly proportional to a volume of fluid entering the at least one non-electrically activated pump; mixing the drawn-in at least one chemical within the diverted fluid portion of the fluid system; and returning the diverted fluid portion to the main flow.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The present invention is a completely pneumatic device that requires no electric energization in order to treat a fluid system (e.g., a fire sprinkler system) with chemicals. The present invention offers several advantages over conventional fluid treatment systems especially by providing a lower cost solution with precise repeatability. By treating these fluid systems with chemicals, the present invention seeks to protect and maintain the longevity of the fluid system, preventing damage to the fluid system or enhancing the operation characteristics of the fluid system.

Figure 1:
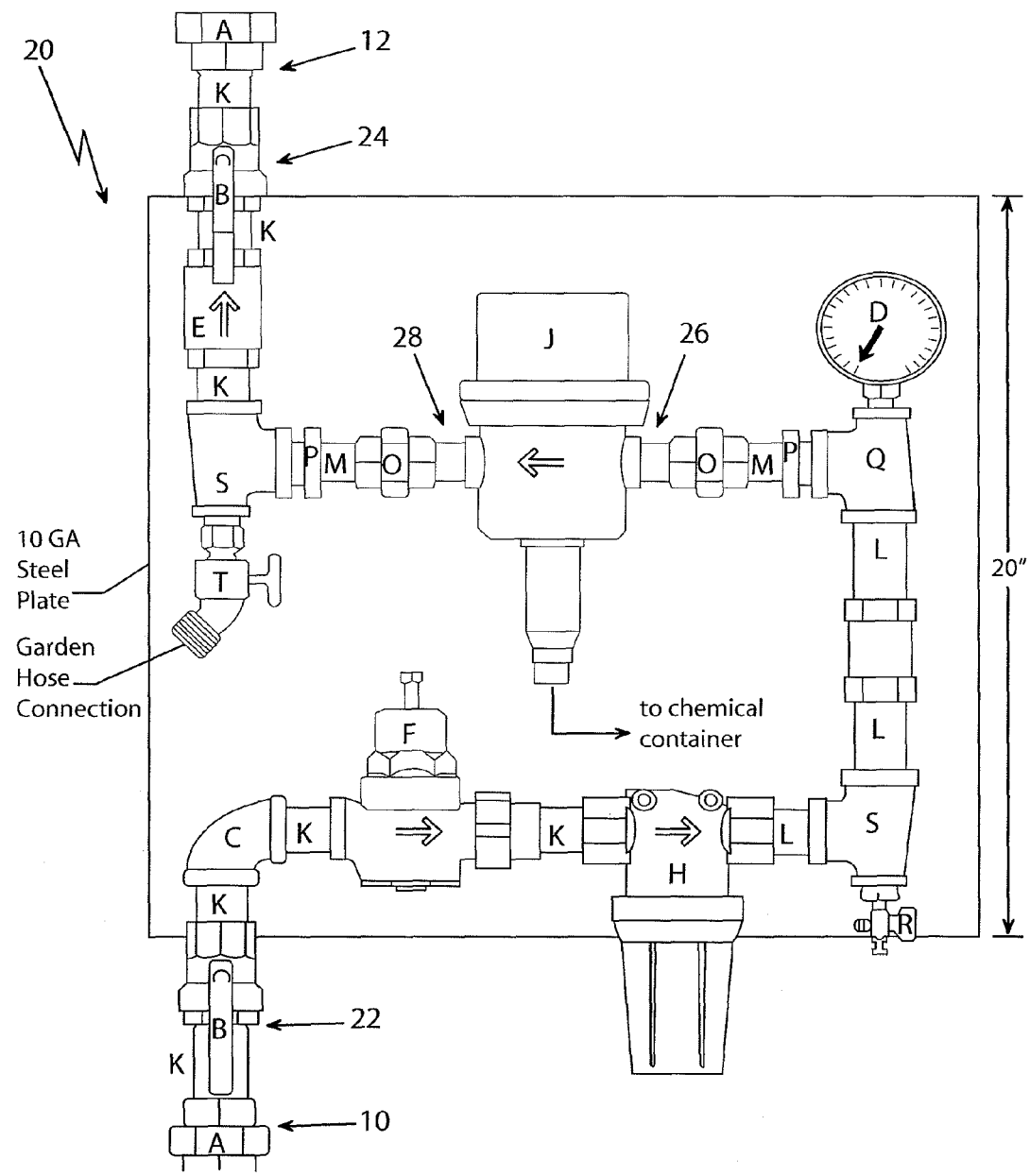
FIG. 1 is a plan view of the bypass feeder device of the present invention.

As shown in FIG. 1, the bypass feeder device (BFD) 20 comprises several components, including at least one pump J, coupled together that divert a portion of a fluid flow to permit the automatic introduction of chemicals, from chemical containers, into the overall fluid of a fluid system (e.g., municipal or building fire sprinkler systems, cooling tower systems, boiler systems, waste water systems, metal-finishing systems, potable water systems, vehicle washing systems, agricultural applications, etc.) to which the BFD 20 is coupled. It should be understood that the BFD 20 can be a permanent installation to the fluid system or it can be a portable device that can be temporarily coupled to the fluid system that is being chemically treated and then de-coupled; in the latter situation, when it becomes necessary to the treat the fluid system again, the BFD 20 can be re-coupled to the fluid system. It should be understood that the components specified in FIG. 1 are by way of example only and are not limited to those components.

The chemicals (e.g., corrosion inhibitors, wetting agents, polymeric dispersants, biocides, biostats or other water chemical enhancing effects, etc.) being added to these particular systems may vary. For example, for cooling tower systems, the injected chemicals may comprise biocides, corrosion inhibitors and dispersants. For boiler systems, these chemicals may comprise deairator chemicals (e.g., oxygen scavengers), steam and condensates (e.g., pH adjustments). For chilled/hot water systems, these chemicals may comprise corrosion inhibitors, biocides and pH adjustment chemicals. For waste water systems, these chemicals may include polymers and flocculants. For metal-finishing systems, the chemicals are typically acids, caustics, corrosion inhibitors and biocides. For potable water systems, the chemicals may comprise corrosion inhibitors for DWA (Drinking Water Approved) product lines as well as chlorine and drinking water sterilants. These chemicals enhance the operation characteristics of the system, such as preventing corrosion, inhibiting, killing, cleaning and/or preventing microbiological-influenced corrosion.

The following discussion of the BFD 20 involves its use with fire sprinkler systems by way of example only and it should be understood the use of the BFD 20 has a wide variety of applications.

Figure 2:
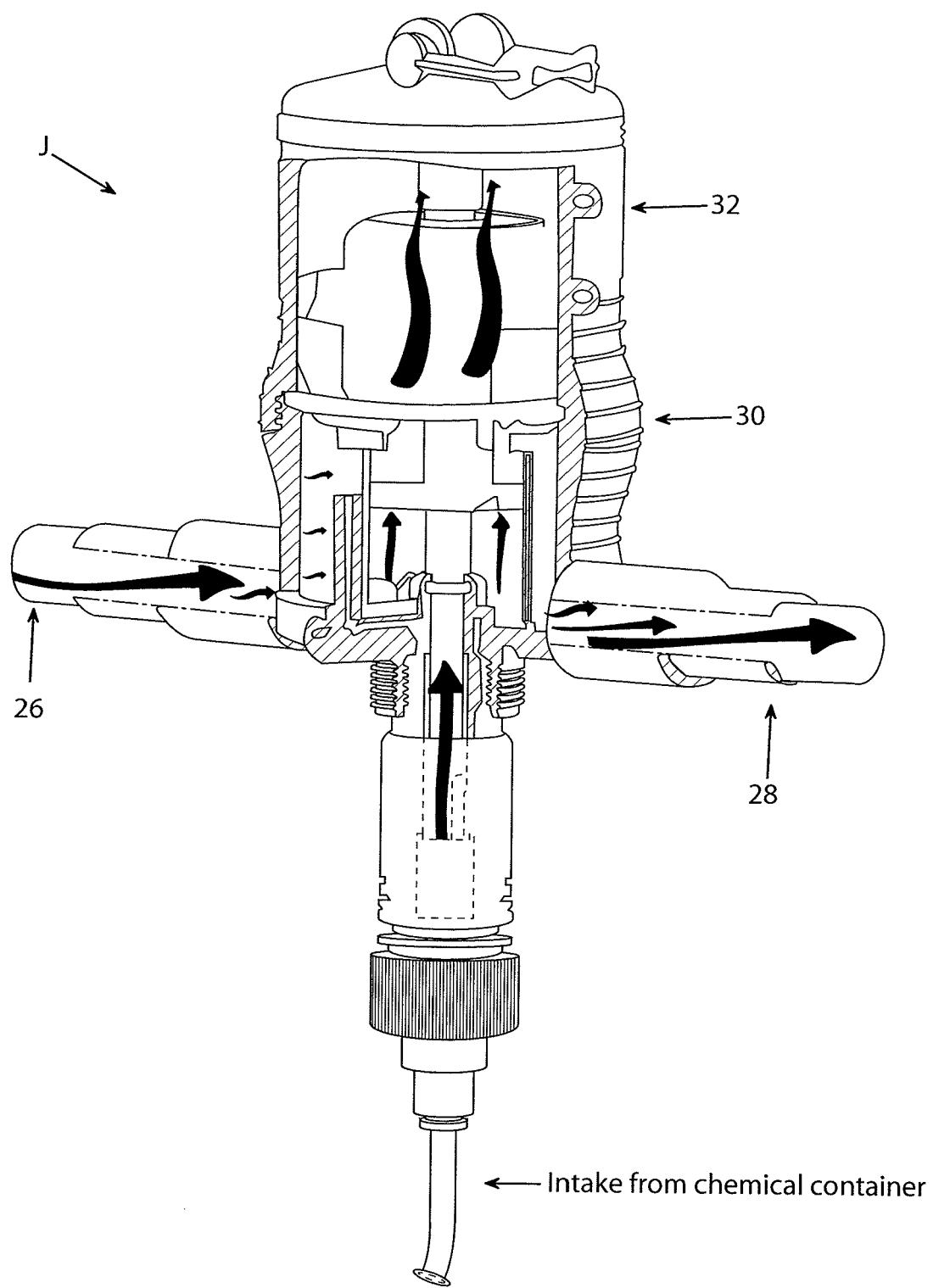
FIG. 2 is a cut-a-away view of the pump portion of the present invention.

One of the key components of the BFD 20 is the pump J which operates without electricity, using fluid (e.g., water) pressure as the power source. By way of example only, the pump J may comprise an A12-2.5% 112421 water-driven metering pump, manufactured by Dosmatic U.S.A., Inc. of Carrollton, Tex. under the tradename MINIMS, or any other water-driven metering pumps. As shown most clearly in FIG. 2, the fluid drives a motor piston 32 by entering a pump inlet 26, which pulls the required percentage of the chemical (not shown) directly from the chemical container(s) (also not shown). Inside a mixing chamber 30 of the pump J, the chemical is mixed with the fluid and wherein the chemical does not come into contact with the pump motor 32. Once the chemical is mixed with the fluid in the mixing chamber 30, the fluid pressure forces the mixed solution downstream and out through a pump outlet 28. The amount of chemical is directly proportional to the volume of fluid entering the pump J, regardless of variations in flow or pressure. As a result, there is no need to include sensors that monitor chemical levels in the overall system flow and then to have some controller make a determination to activate a pump to feed more chemicals into the fluid system. With no electric energization of the BFD 20, this further reduces the risk of fire or explosion since there is no ignition source in the BFD 20 that can inadvertently ignite any flammable chemicals that may be used or in the vicinity of the BFD 20 when installed. In addition, the BFD 20 can be relied on to deliver chemical treatment without the concern for loss of any electrical power that can plague existing water treatment devices that require electric energization. Because the BFD 20 requires no electricity to operate, its "carbon footprint" is also minimized, thereby making it environmentally-friendly.

Furthermore, the number of pumps J included in the BFD configuration determines the amount of chemical that can be introduced into the fluid system from the chemical container(s).

FIG. 1 shows the BFD 20 in detail using a single pump J, it being understood that more than one pump J can be included, as will be discussed shortly. An input ball valve 22 and an output ball valve 24 provide the two endpoints for coupling the BFD 20 to any fluid system being treated. By way of example only, the input valve 22 is shown in FIG. 1 coupled to a nipple K/union A 10 of an existing fluid system; similarly, the output valve 24 is shown coupled to a nipple K/union A 12 of that fluid system. Thus, a portion of the flow of fluid system is diverted through, and returned through, the BFD 20 via these ball valves 22/24, respectively. The pump J has its inlet port 26 and output ports 28 coupled between unions O. A third port of the pump J is coupled to the chemical container(s) for drawing the precise amount of chemical such that it is directly proportional to the volume of fluid. The BFD 20 can be secured to a surface (e.g., a 10GA steel plate) to permit the BFD 20 to be easily manipulated during installation. In addition, the BFD 20 comprises a filter H (e.g., a poly basket strainer), a pressure controller F (e.g., pressure regulator), an indicator D (e.g., a pressure gauge), a drain R (e.g., a petcock) and a flush T (e.g., a hose bib). Although not shown, the BFD 20 may also include a water hammer eliminator. Therefore, the BFD 20 may comprise a carrying means, a filter means, a pressure control means, a flow control means, a shut-off means, a delivery means, a draining means, a flushing means, an indicating means, a backflow means, a water hammer eliminating means, a mixing means, a proportional fluid flow chemical feed pumping means and a connecting means to a fluid flow means.

It should be understood that the following is a listing of the components shown in FIG. 1 and they are shown simply by way of example and not by way of limitation:

| Reference No. | Quantity | Description |
|---|---|---|
| A | 2 | 1" union |
| B | 2 | 1" brass ball valve |
| C | 1 | 1" elbow |
| D | 1 | ABS Pressure gauge |
| E | 1 | Conbraco 1" line check valve |
| F | 1 | Watt's Pressure Regulator; Serial No. 0930W Range 25-75; Model #25AUBZ3 |
| H | 1 | Basket Strainer |
| I | 1 | 12 GPM 1" Valve, Dole Valve Company |
| J | 1 | Dosmatic MiniDos 2.5% 12 GPM Pump |
| K | 7 | 1" × 2" Nipple |
| L | 3 | 1" × 3" Nipple |
| M | 4 | ¾" × 2" Nipple |
| O | 2 | ¾" Union |
| P | 2 | 1" × ¾" Bushing |
| Q | 2 | 1" × 1" × ¼" Tee |
| R | 1 | ¼" Petcock |
| S | 1 | 1" × 1" × ½"Tee |
| T | 1 | ½" Hose Bib |
| U | 6 | Clamps |

Items A, C, J, K, M, N, O, P, Q, and R include Ward Fittings. Furthermore, the steel plate in FIG. 1 is shown only by way of example for supporting the BFD and, although not shown, various components of the BFD are secured or clamped to the steel plate to support the BFD thereon. Thus, the use of the steel plate and its size does not, in any way, limit the present invention to such use.

Figure 3:
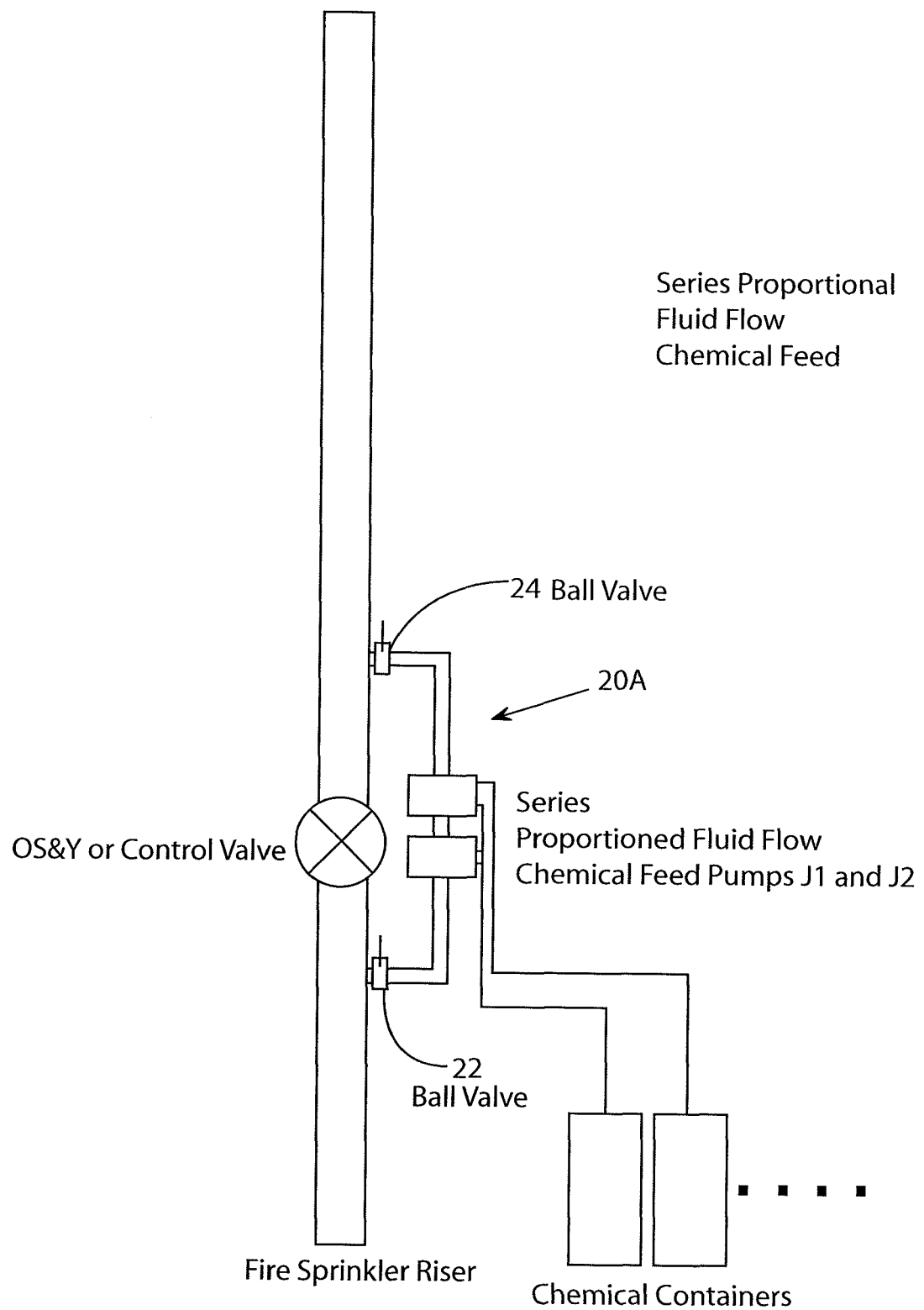
FIG. 3 is a block diagram of a series configuration of pumps in a first embodiment of a bypass feeder device coupled to a fire sprinkler riser.

FIG. 3 depicts a first embodiment 20A of the BFD showing how it is interfaced with a main riser of a fire sprinkler system via the ball valves 22 and 24. In particular, BFD 20A comprises a pair (by way of example only) of series of pumps J1 and J2 that are both coupled to chemical containers via their third ports. With the BFD 20A coupled to the main riser of the fire sprinkler system, when it necessary to chemically treat the fire sprinkler system, the operator closes the OS&Y ("outside stem and yoke") or control valve and then drains (not shown), located in the downstream portion of the fire sprinkler system. This permits all of the water in the fire sprinkler system to be evacuated. The drains are then closed and the two ball valves 22 and 24 are then opened, which permits the fluid to flow through the BFD 20A from the fluid source (not shown); in particular, the fluid enters from the lower end of the fire sprinkler riser shown in FIG. 3. As the fluid flows through the BFD 20, the pumps J1 and J2 draw in the precise and proportional amount of chemicals for treating the fire sprinkler system. When the fire sprinkler system is filled, the two ball valves 22 and 24 are closed and then the OS&Y or control valve is re-opened. The fire sprinkler system is now ready for use and has been properly treated with the appropriate chemicals. Periodic checks are made to determine if the fire sprinkler system fluid requires another chemical treatment.

Figure 4:
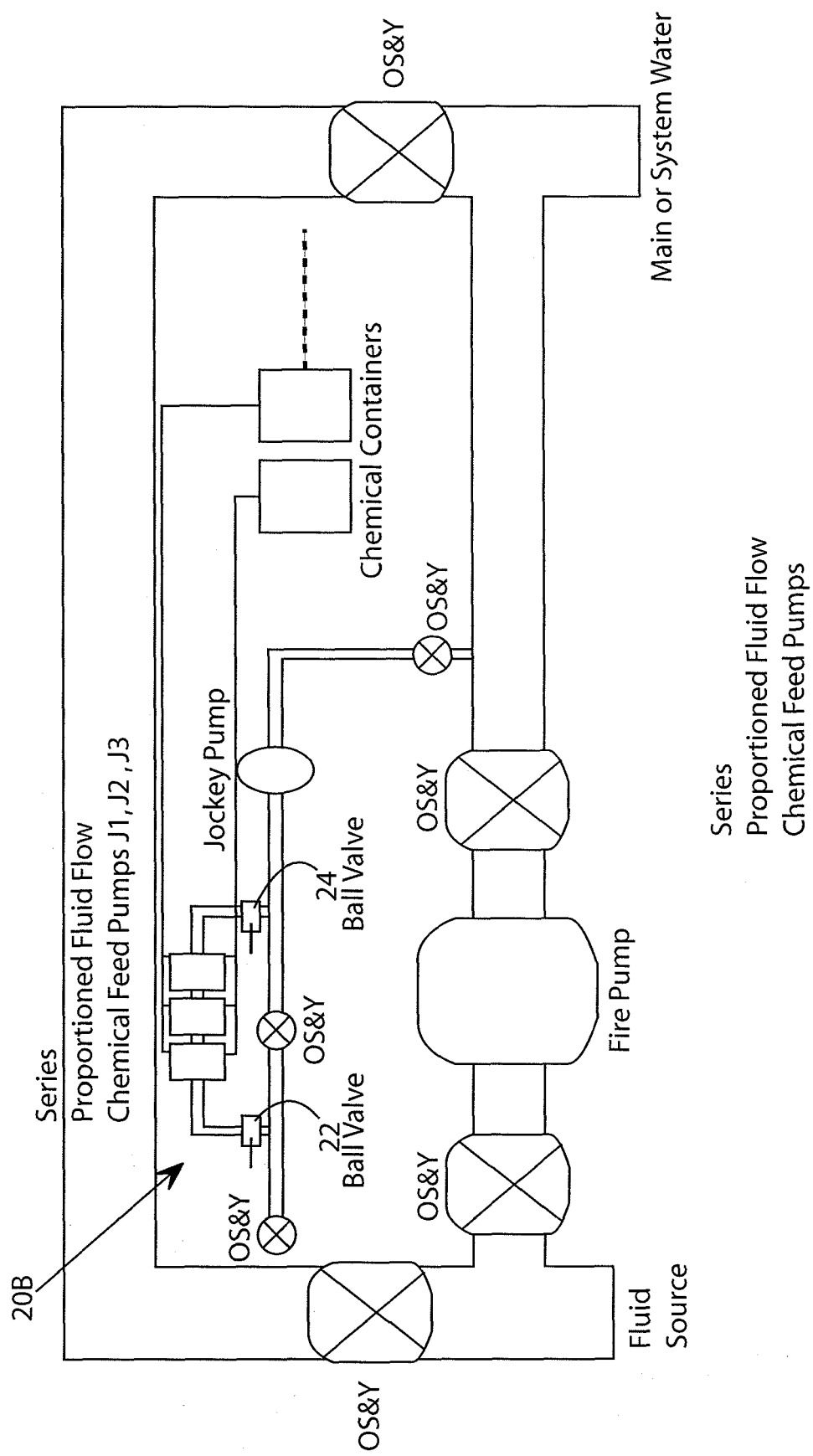
FIG. 4 is a block diagram of a series configuration of pumps in a second embodiment of a bypass feeder device as part of a fire sprinkler system using a fire pump/jockey pump configuration.

FIG. 4 depicts a second embodiment 20B of the BFD, using a series of three pumps J1-J3, and which is coupled in series with a jockey pump. Each of the pumps J1-J3 is coupled to chemical containers. In a jockey pump-style fire sprinkler system, a jockey pump is provided to always maintain a high pressure water supply in the fire sprinkler system; thus, the jockey pump maintains the fire pump in an "off" condition by providing sufficient make-up fluid (e.g., due to downstream leaks) when necessary while also feeding the proper amount of chemicals when the jockey pump is turned on. When this configuration 20B is initially installed, the fire pump is turned off The BFD 20B is then coupled to the fire sprinkler system, as shown in FIG. 4. In this configuration, the pumps J1-J3 (three, by way of example only) are coupled to the suction (i.e., upstream) side of the jockey pump. The fire sprinkler system is then filled only by way of the jockey pump bypass path, while these pumps J1-J3 draw in the precise and proportional amount of chemicals. Once the fire sprinkler system is filled, the fire pump is then turned back on. At this point, whenever the jockey pump is activated (e.g., a leak occurs downstream, etc.), the pumps J1-J3 will experience the inflow from the jockey pump and will draw in the precise and proportional amount of chemical, from the chemical containers, to feed the flow passing through the jockey pump.

Figure 5:
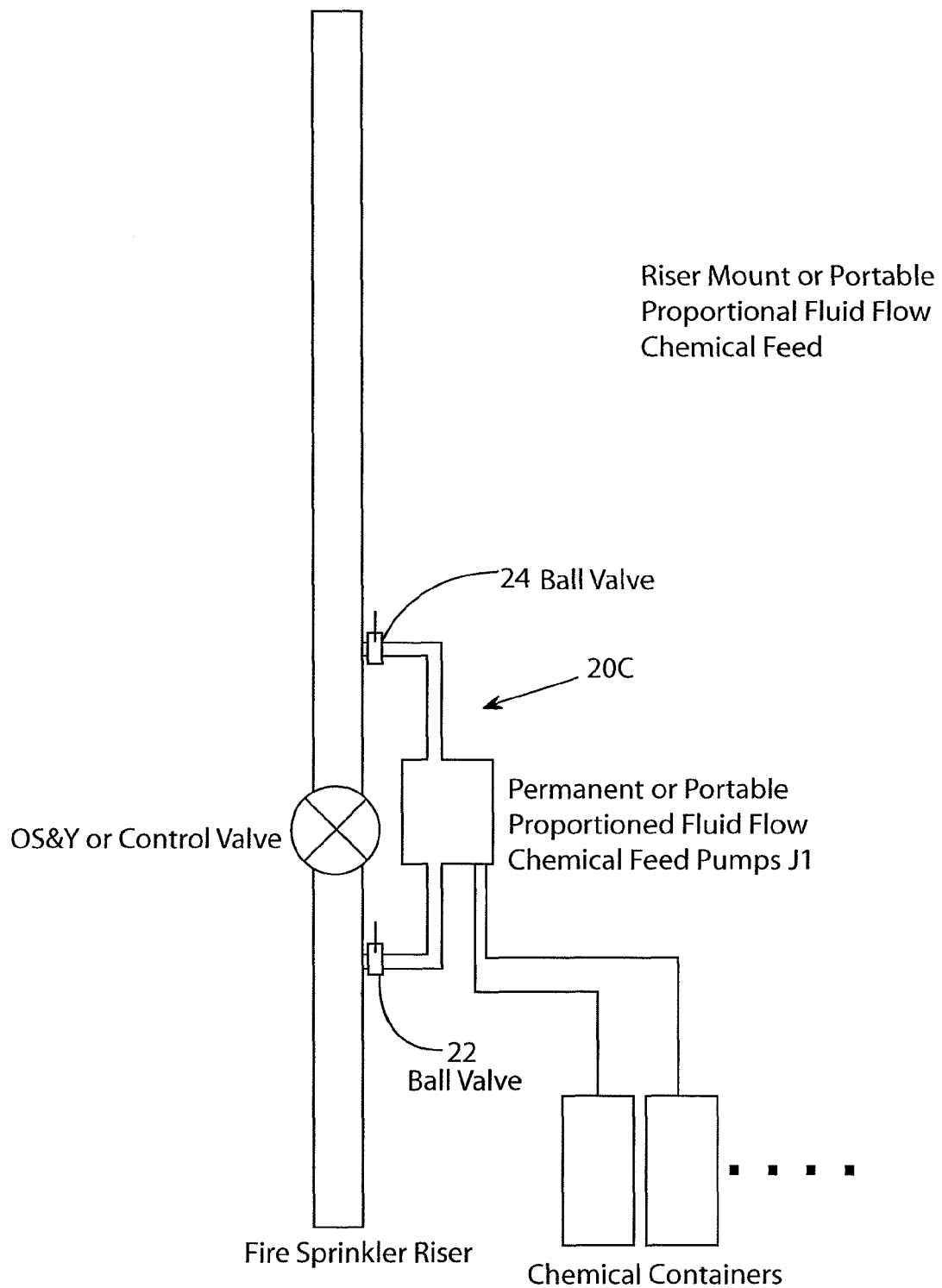
FIG. 5 is a block diagram of a third embodiment of the bypass feeder device that can be permanently secured to a fire sprinkler riser.

FIG. 5 depicts a third embodiment 20C of the BFD which can be permanently connected to the main riser of a fire sprinkler system, or which is portable such that the BFD 20C can be coupled to the main riser only when needed. The third embodiment 20C uses a single pump J1 that is coupled to the chemical containers via the pump's third port. Treatment of this fire sprinkler system follows the same process described above for FIG. 3.

Figure 6:
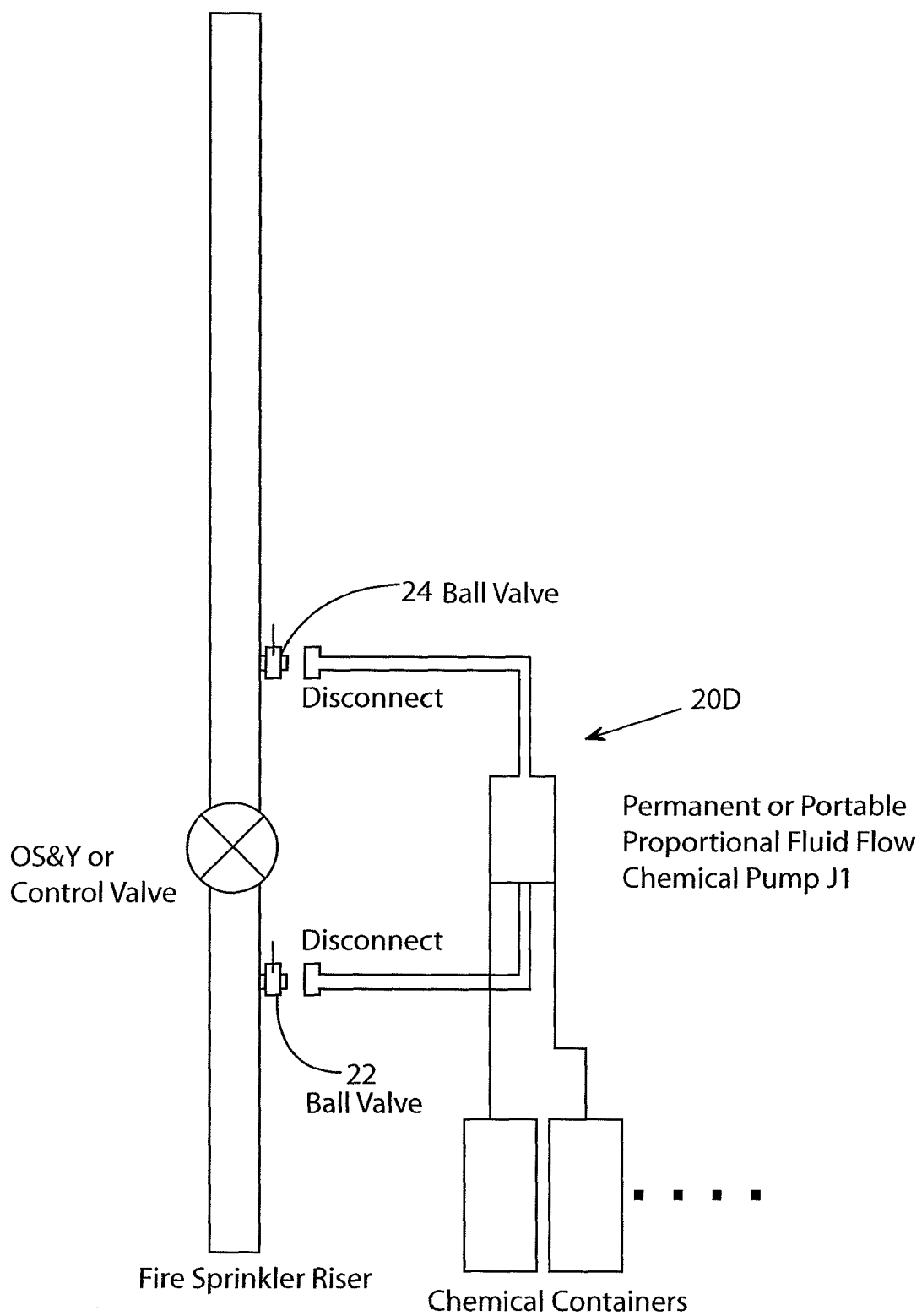
FIG. 6 is a block diagram of a fourth embodiment of the bypass feeder device using a single pump that can be temporarily coupled to a fire sprinkler riser and is portable.

FIG. 6 is similar to the BFD of FIG. 5 but in this fourth configuration 20D, the BFD is portable and can be temporarily coupled to the fluid system on an "as needed" basis. Treatment of this fire sprinkler system follows the same process described above for FIG. 3.

Figure 7:
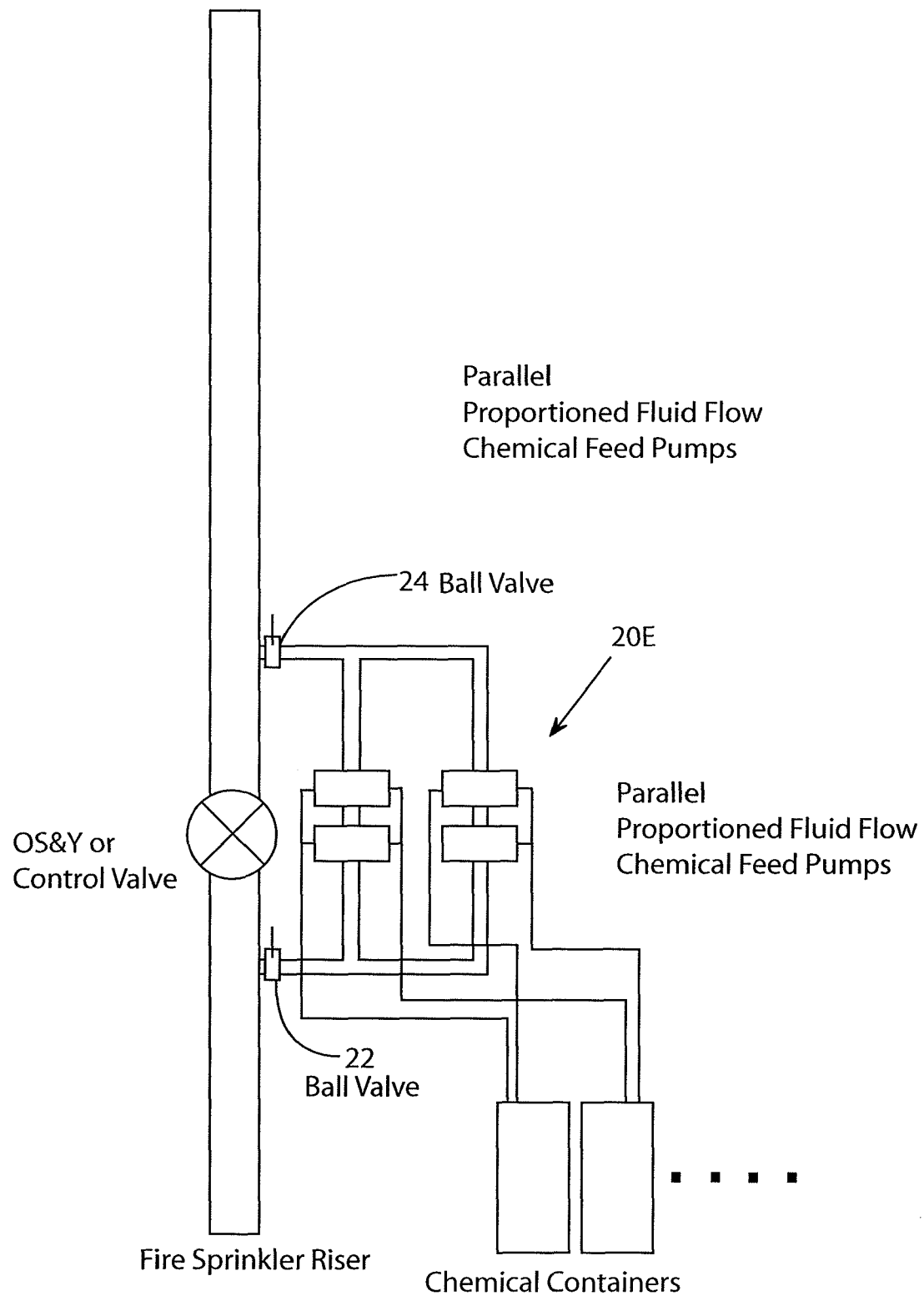
FIG. 7 is a block diagram of a fifth embodiment of the bypass feeder device using parallel pumps coupled to a fire sprinkler riser.

FIG. 7 depicts a fifth configuration 20E of the BFD that utilizes two (by way of example only) parallel paths with two (also by way of example only) pumps (i.e., J1-J2 and J3-J4) in each path for treating the main riser in a fire sprinkler system. Operation of this treatment system is similar to those described for FIG. 3.

Figure 8:
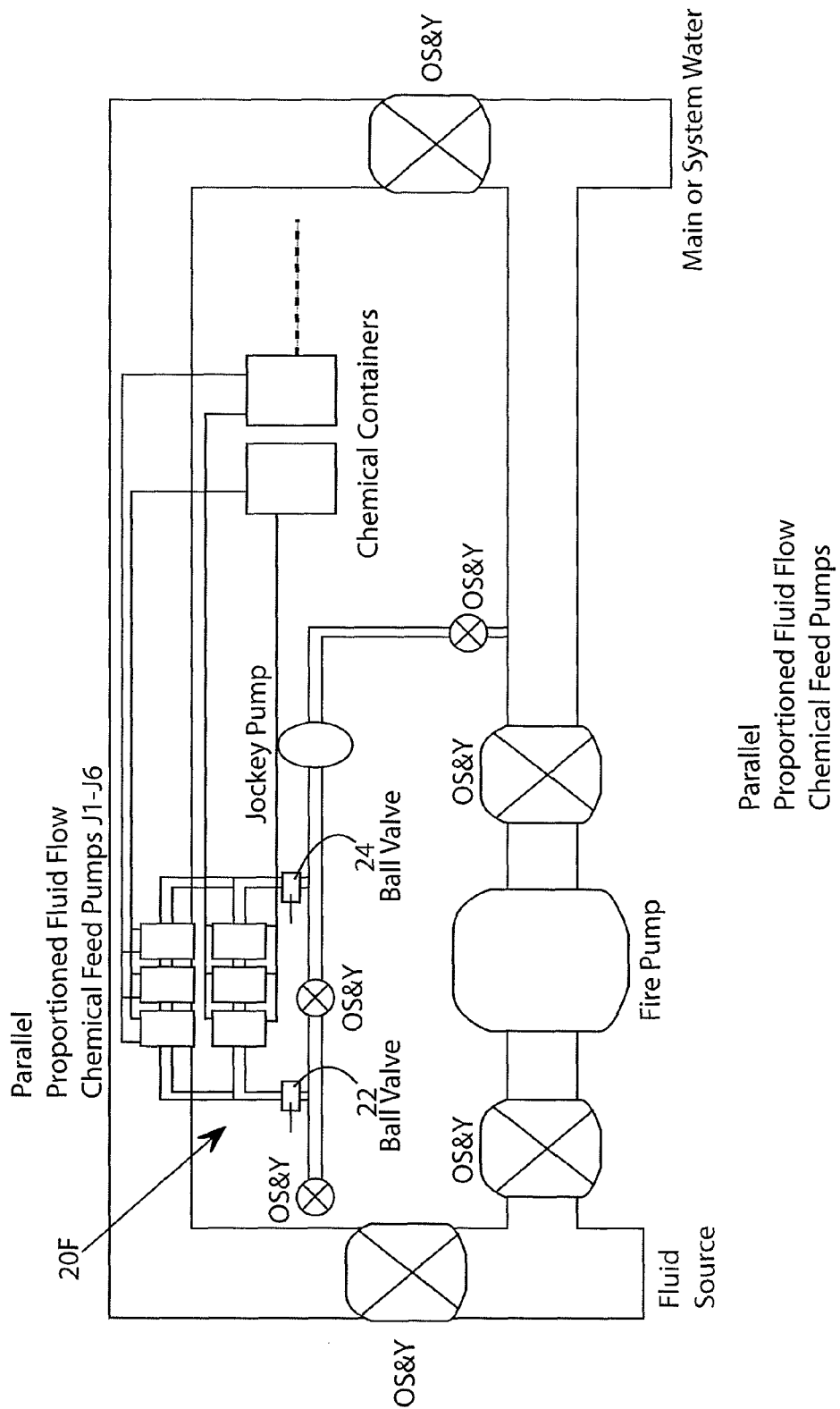
FIG. 8 is a block diagram of a sixth embodiment of the bypass feeder device using parallel sets of a plurality of pumps as part of a fire sprinkler system using a fire pump/jockey pump configuration.

FIG. 8 depicts a sixth embodiment 20F of the BFD that utilizes parallel paths with a plurality (e.g., three, by way of example only) pumps (i.e., J1-J3 and J4-J6) in each path and which is inserted on the suction side of a jockey pump. Operation of this treatment system is similar to those described in FIG. 4.

Figure 9:
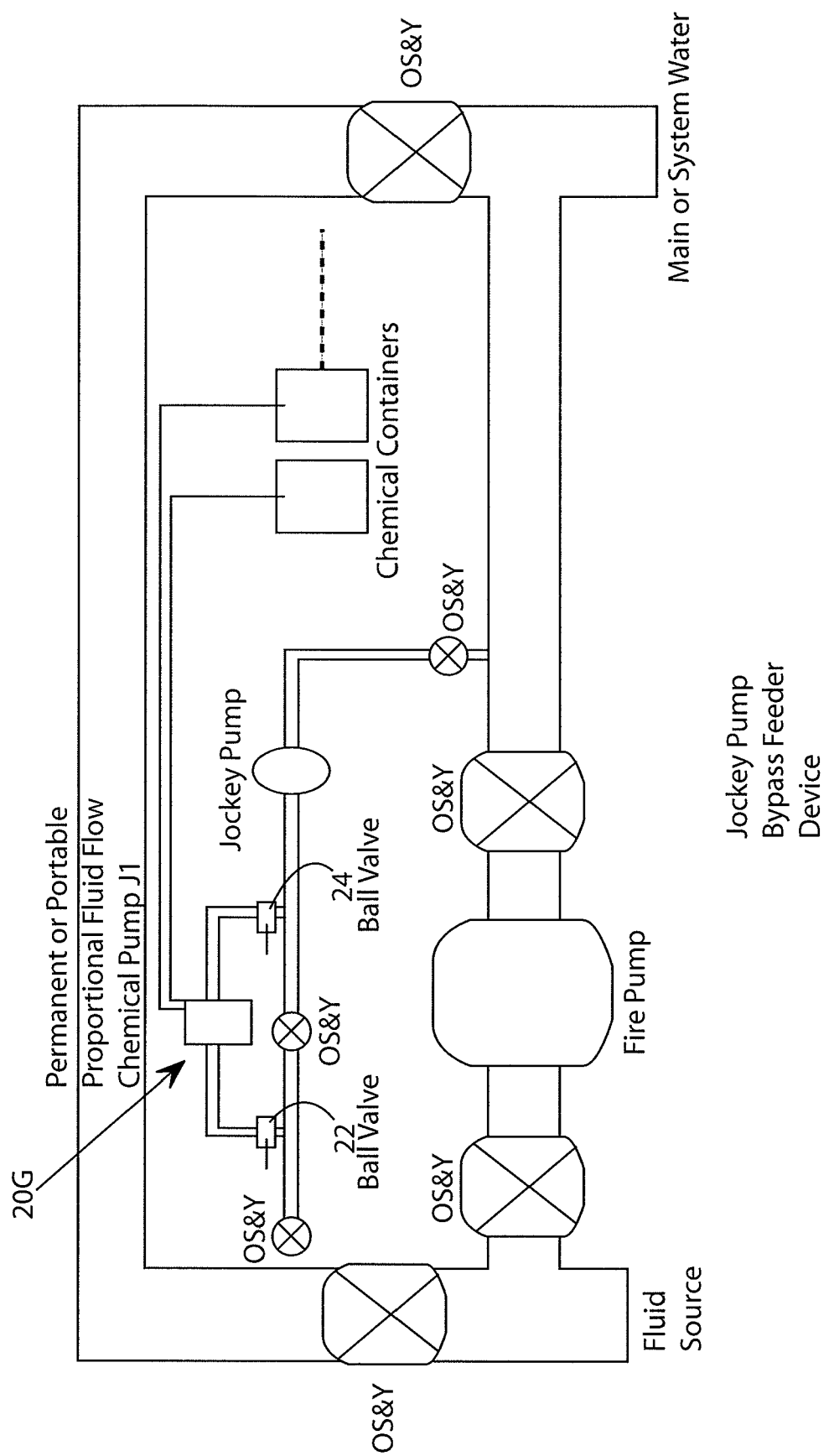
FIG. 9 a block diagram of a seventh embodiment of the bypass feeder device using a single pump that can be permanently secured to, or temporarily coupled to, a fire pump/jockey pump configuration with the temporarily coupled bypass feeder device being portable.

FIG. 9 depicts a seventh embodiment 20G of the BFD that utilizes either a permanent connection or a temporary connection of the pump J1 to the suction side of the jockey pump path of a fire sprinkler system. Operation of this treatment system is similar to those described for FIG. 4.

It should be understood that the phrase "chemical container(s)" covers any and all types of storage such as but not limited to pails, drums, tanks, totes and trucks for at least one or more chemicals capable of maintaining the longevity of the fluid system by preventing damage to the fluid system or enhancing the operation characteristics of the fluid system, such as, but not limited to, the prevention of corrosion, inhibiting, killing, cleaning, preventing microbiological influenced corrosion.

While the invention has been described in detail and with reference to specific examples thereof, it will be apparent to one skilled in the art that various changes and modifications can be made therein without departing from the spirit and scope thereof.

What is claimed is:

1. An apparatus for automatically feeding a precise amount of at least one chemical to a flow of a fluid system, said apparatus comprising:
   at least one pump, coupled to at least one chemical container, said at least one pump drawing an amount of the at least one chemical from said container that is directly proportional to a volume of fluid entering said pump only when said pump is exposed to the flow of said fluid system, said at least one pump is coupled in series with a jockey pump and which are coupled in parallel with a fire pump of a fire protection system;
   an inlet valve for coupling an upstream side of said pump to said fluid system and an outlet valve for coupling a downstream side of said pump to said fluid system to form a bypass for diverting a portion of the fluid flow therethrough.

2. The apparatus of claim 1 wherein said pump comprises a motor piston and a mixing chamber, said motor piston drawing in said amount of said at least one chemical from said container caused by pressure in the fluid flow and wherein said mixing chamber mixes said drawn-in chemical within the fluid flow.

3. The apparatus of claim 1 wherein said inlet valve and said outlet valve are fixedly secured to said upstream and downstream sides of said fluid system, respectively.

4. The apparatus of claim 1 wherein said inlet valve and said outlet valve are temporarily coupled to said upstream and downstream sides of said fluid system, respectively, and wherein said apparatus is portable.

5. The apparatus of claim 1 wherein said at least one chemical container comprises at least one chemical from the group consisting of corrosion inhibitors, wetting agents, cleaning agents, polymeric dispersants, biocides and biostatic agents.

6. The apparatus of claim 1 wherein the fluid flow system comprises one from the group of fire protection mains, fire risers, fire headers, fire loops, city water piping and hoses.

7. The apparatus of claim 1 wherein said at least one pump comprises a plurality of pumps in series located between said inlet and said outlet valves, each of said pumps being coupled to a plurality of chemical containers.

8. The apparatus of claim 7 wherein said apparatus is coupled to the fluid system so as to bypass a control valve or a pump of the fluid system.

9. The apparatus of claim 1 wherein said at least one pump comprises a plurality of pumps in series and wherein each of said pumps in series are coupled to a plurality of chemical containers.

10. The apparatus of claim 1 wherein said at least one pump comprises a first set of pumps in series arranged in parallel with a second set of pumps in series, said first and second set of pumps being positioned between said inlet and said outlet valves and wherein each of said pumps are coupled to a plurality of chemical containers.

11. The apparatus of claim 1 wherein said at least one least one chemical container may comprise one of a group of pails, drums, tanks, totes and trucks.

\* \* \* \* \*